Patented Sept. 12, 1939

2,173,041

UNITED STATES PATENT OFFICE 2,173,041

PRODUCTION OF STARCH SOLUTIONS

Josef Müller, Weissenstein-on-the-Drau, Carinthia, Austria

No Drawing. Application December 31, 1937, Serial No. 182,913. In Austria January 20, 1937

15 Claims. (Cl. 127—33)

The present invention relates to a process for producing starch solutions, particularly adapted for the sizing and finishing of textiles, and to compositions for carrying out this process.

The invention makes use of the ability of persulphates, that is to say, the salts of persulphuric acid, $HSO_3$—O.O—$SO_3H$, to convert starch into a soluble modification.

An object of this invention is to provide a process for converting starch-containing raw material into a homogeneous solution of modified starch which is directly ready for use, especially in the textile industry.

Another object of this invention is to provide a one stage process for the production of the solution specified, which is simple and economical, and can be carried out in a short space of time.

A further object is to produce starch solutions of a neutral or alkaline nature exerting no detrimental action on textile goods when used for impregnating such goods.

A still further object is to provide compositions of matter in a dry form which may be brought on the market in the dry form, for use in producing starch solutions.

Further objects will be apparent as the description proceeds.

A process has been described in which persulphates have been proposed for rendering starch soluble by mixing starch meal with about 3-5% of ammonium persulphate, adding cold water, leaving the mixture to stand for about 10 hours with occasional shaking up, then decanting the water from the starch treated but undissolved, filtering, washing to the point of complete elimination of the ammonium sulphate, and then drying the modified starch at suitable temperature in drying chambers. To obtain a solution serviceable for sizing in the textile industry, starting from this dry product, the dry product was heated with water with the result that the product becomes gradually completely liquefied, and yields a solution which sets to a gelatinous mass on cooling.

This proposal, however, has not been adopted in practice. The reaction mixture resulting from the prolonged action of persulphate upon starch in the cold in the first step or stage of that process is not fit for immediate use if only for the reason that it represents a non-homogeneous system; besides, this reaction mixture is acid owing to the formation of acid sulphates and/or of free sulphuric acid by decomposition of comparatively great amounts of the persulphate present. It is therefore necessary in the second step or stage of that process to separate the modified starch from the acid solution by filtration and to wash the same free of acid, after which the drying process follows. The starch solution ready for use is only obtained by effecting liquefaction of the dry product by boiling it with water. It will be obvious that this multi-stage process gives rise to very considerable difficulties and requires a great deal of time.

The present process obviates all these drawbacks, since it is capable of being carried out in a much shorter time and in a very considerably simpler manner. The process according to the invention has the advantage that it yields directly starch solutions that are ready for use.

The process according to the present invention for the production of starch solutions, particularly adapted for sizing and finishing textiles, consists essentially in heating starch or starchy raw materials in aqueous solution containing persulphate until the starch is substantially dissolved, so as to form a starch solution. The term starch solution is of course to be taken to mean what is understood by the same in common technical language, namely, the pseudo-solutions of starch in water.

Using 1 per cent of persulphate, calculated on the basis of the air-dried starch used, there are obtained with certainty very thinly liquid solutions, and that irrespective of what kind of starch, e. g. potato starch, rice starch, maize starch, wheat starch, or the like, is taken for the purpose. Speaking generally, however, starch solutions of very satisfactory properties may be obtained with the use of far smaller quantities of persulphate, say of the order of 0.1% to 0.3%, by weight, based on the air dry starch.

If the proportion of acid constituents in the starch solution were to become considerable the material of the apparatus and of other mechanical equipment coming in contact with the starch solutions or with fibres, fabrics, and the like impregnated therewith in the course of the use of these solutions, might become attacked thereby, and since it is desirable to avoid this, if only in view of the danger of discoloration of the goods handled, for instance by rust marks or stains. Different ways of procedure may be adopted in accordance with the invention for the purpose of preventing the usefulness of the starch solutions obtained from being depreciated by the presence therein of acid products of the decomposition of the persulphate. Thus, numerous tests have shown that the quantity of persulphate required to convert starch into a starch solution in the heat is remarkably small as compared with that required in the known multi-stage process working in the cold, and may be reduced to so small a figure, without impairing the specific effect, that the resulting starch solutions are practically neutral or even actually alkaline. Generally speaking, there are obtained solutions which show a neutral reaction as indicated by methyl orange, when the quantity of persulphate used amounts to 0.5% or less calculated on the basis of the air-dry starch used; since as little as 0.1% to 0.3% of persulphate (referred to the weight of the air-dried starch) is sufficient to convert starch into the condition of a uniform and colorless solution which is sufficiently thinly liquid for practical use, while the slight quantities of acid reaction products formed with the use of such small amounts of persulphate are completely neutralized, on the one hand by the starch or basic substances contained therein and on the other hand by the salts causing hardness always present in water, there are obtained in this case, without further treatment, starch solutions which are of neutral or weakly alkaline reaction as indicatd by methyl orange. When the water used is hard there are obtained, even when the quantity of persulphate used is larger and amounts for instance to as much as 1% of the starch, starch solutions which are neutral or which at all events contain acid constituents in such slight amount as to be innocuous. When ordinary water (for example spring water) is used, which at 10° of hardness for example consumes 3.6 ccs. of n/10 HCl per 100 ccs., an addition of 0.5% of persulphate, for instance, calculated on the basis of the starch used, the starch solution obtained is at all events still within the alkaline range. The liquefying effect obtained with the quantity is sufficient for ordinary purposes.

In the multi-stage process of the prior act, 3 to 5% of persulphate, based on the starch, was used. The amounts of persulphate used in the present one step process, as will be observed from the above discussion, are very substantially lower than the 3% which is the minimum recommended in the above mentioned multi-stage process. This saving of persulphate is an important advantage of the process of the present application.

Another way of obtaining starch solutions which show no acid reaction whatever the quantity of persulphate used is to employ neutralizing agents. The addition of the usual neutralizing agents, such as caustic alkalies, carbonates, or tertiary phosphates, however, as proved by experience, causes a yellow discoloration of the starch solutions. Continued experimental work has further shown that such yellow discoloration of the starch solutions does not occur provided, simultaneously with a neutralizing agent of the above-mentioned kind, a slight amount of hydrogen peroxide be introduced into the solution. This purpose is served still better by using, as neutralizing agent, alkaline reacting derivatives or addition compounds of hydrogen peroxide, that is to say compounds which yield hydrogen peroxide directly in solution by decomposition, such as percarbonates, perborates, perphosphates, or which, in the presence of acid, yield hydrogen peroxide, such as peroxides of the alkaline earths, and the like. It is particularly expedient to use perpyrophosphate, since this salt also at the same time has a protecting effect upon iron. It will be clear that it is also possible to combine these two measures, that is to say to use very small quantities of persulphate, for example 0.5% or less, and at the same time to add neutralizers. In this manner it is possible to make sure of neutralizing any acid decomposition products of persulphate formed, even when the degree of hardness of the water used and the kind of starch used vary.

The starch solutions may either be prepared at the works or plant in which they are to be used, or in a separate plant. In the former case finished mixtures ready for use may with convenience be placed at the consumer's disposal, which contain persulphate and solid neutralizing agents of the type specified above in such proportions that the acid reaction products resulting from the decomposition of the persulphate are neutralized; in this case it may be expedient to use a slight excess of neutralizing agent. If desired the starch may also be added to such mixtures in advance, so that the user merely has to distribute the mixture, as supplied, in a specified quantity of water and to heat the same for a short time until a homogeneous solution is formed. It is likewise possible to supply the consumer with a mixture of starch with the specified small quantity of persulphate (0.5% or less being suitable) but without neutralizing agent. Other additions commonly used in sizing and finishing agents, such as fats, soaps, gum, dextrine, and the like may also be incorporated in such mixtures of persulphate and starch or persulphate and neutralizing agents or persulphate, neutralizing agents, and starch.

The following are some examples of such mixtures:

(1) 65 parts of potassium persulphate + 35 parts of sodium percarbonate.
(2) 45 parts of potassium persulphate + 55 parts of sodium perpyrophosphate.
(3) 80 parts of potassium persulphate + 20 parts of calcium peroxide.
(4) 85 parts of potassium persulphate + 15 parts of magnesium peroxide.
(5) 50 parts of potassium persulphate + 50 parts of perborate.

Similar mixtures may be made up with sodium or ammonium persulphate. It is also possible to combine different persulphates in the mixtures and to use alkaline reacting persalts, if desired, combined with peroxides as neutralizing agents therein.

Persulphates by themselves or in various combinations of persulphate with peroxides and/or alkaline reacting persalts may also be commixed with fatty substances e. g, tallow, soap or the like protecting the oxygen deliberating agents from the action of the atmosphere and be put on the market in this form as means for the production of sizes and finishing baths. For example, tallow may be melted down at low temperature with 20% of potassium persulphate or with 50% of the above mixture (1), and in this manner there is obtained a preparation which is suited for obtaining very useful sizing and finishing agents. Finally, the persulphates or the mixtures thereof with alkaline reacting persalts and/or peroxides may be commixed with dry starch, for which purpose the composition is as a rule such that 1% of persulphate or less is provided in proportion to the starch by weight. Thus for example potato starch is mixed with 1% of the above mixture (2) and thoroughly commixed therewith.

The carrying out of the process according to the invention is very simple. For example, 0.5 kg. of the above specified mixture of potato starch and one percent (1%) of a mixture consisting of 45 parts of potassium persulphate and 55 parts of sodium perpyrophosphate, is gradually introduced in 10 litres of cold water and the resulting suspension heated cautiously to about 80 to 90° C. preferably on a water bath with stirring. After 20 to 30 minutes the liquefied state is reached. The solution is perfectly colorless, reacts weakly alkaline, and gives a clearly blue iodine reaction. The solution is thinly liquid and very well suited for the sizing of textile threads, more particularly when high speed machines are used. When used as a finishing agent, this solution, while effecting a high degree of stiffening, owing to the high grade penetration into the fibres of the material treated, also gives good results and is economical in use. The preparing and making up of the sizing and finishing baths (and also printing thickeners) may be effected without exception in the usual manner by boiling up in an open pot or in a pressure vessel, but care should be taken to ensure that thorough stirring is effected during the impasting process so as to preclude any formation of lumps and to make full use of the raw materials.

It may be mentioned that the hydrogen peroxide derivatives and/or addition compounds used conjointly with persulphates in one of the above described forms of the invention, although having in themselves a modifying action upon starch, and although they have in part been used for this purpose, may nevertheless not be regarded as equivalents for persulphates within the scope of the process according to the present invention; the converting of starch into a soluble modification with perborate or percarbonate not only requires about ten times as much oxygen yielding agent as compared with persulphates, to obtain a solution of approximately the same viscosity, but also proceeds, as is known, in a manner different from that with persulphates. The joint use of persulphates and alkaline reacting percompounds leads to changes in the starch which are favorable for technical purposes, and which cannot be achieved with the aid of one of the alkaline reacting percompounds by itself.

In the following claims I use the term "starch" to include starch and starch containing material.

According to the provision of the patent statutes, I have explained the principle and operation of my invention and have described what I now consider to represent its best embodiment. However, I desire to have it understood that, within the scope of the appended claims, the invention may be practised otherwise than as specifically described.

I claim:

1. A process for producing starch solutions which comprises heating starch in an aqueous solution containing persulphate until the starch is substantially dissolved.

2. A process for producing starch solutions which comprises heating a suspension of starch in the presence of persulphate, the amount of persulphate calculated on air-dry starch being lower than about 1% and continuing the heating until the starch has substantially dissolved.

3. A process for producing starch solutions which comprises heating a suspension of starch in the presence of persulphate, the amount of persulphate calculated on air-dry starch being of the order of 0.1% to 0.3% and continuing the heating until the starch has substantially dissolved.

4. A process for producing starch solutions which comprises heating a suspension of starch in water in the presence of persulphate and neutralizing agents and continuing the heating until the starch has substantially dissolved.

5. A process for producing starch solutions which comprises heating a suspension of starch in water in the presence of persulphate, neutralizing agents, and hydrogen peroxide and continuing the heating until the starch has substantially dissolved.

6. A process for producing starch solutions which comprises heating a suspension of starch in water in the presence of a persulphate and alkaline reacting percompounds, such heating being sufficient to dissolve the starch in the presence of said persulphate, and the amount of said persulphate being substantially below 3%, based on the amount of such starch.

7. A process for producing starch solutions which comprises heating a suspension of starch in water in the presence of persulphate and percompounds of the group consisting of percarbonates, perborates, perphosphates, and peroxides and continuing the heating until the starch has substantially dissolved.

8. A process for producing starch solutions which comprises heating a suspension of starch in water in the presence of persulphates and perpyrophosphates and continuing the heating until the starch has substantially dissolved.

9. A process for producing starch solutions which comprises heating starch in the presence of water and persulphate until the starch is substantially dissolved in the water, the persulphate being used in such small amounts that the quantities of acid reaction products derived from the decomposition of the persulphate are substantially neutralized by such basic substances as are commonly present in undistilled water and in starch used in making said reaction mixture.

10. Composition of matter for preparing starch solutions comprising starch, persulphate, and an alkaline reacting percompound, which mixture, when mixed with water and heated will give a starch solution.

11. Composition of matter for preparing starch solutions by heating with starch and water, comprising a persulphate and a solid alkaline reacting percompound in amount at least sufficient to neutralize sulphuric acid produced from the amount of persulphate used.

12. Composition of matter for preparing starch solutions by heating with starch and water, comprising a persulphate and an alkaline reacting percompound co-mixed with substances capable of protecting the oxygen liberating agents from the action of the atmosphere, said alkaline reacting percompound being in amount at least sufficient to neutralize the acidity produced by solution and decomposition of said persulphate.

13. A composition of matter for use in making a starch solution, which comprises ordinary starch mixed with substantially less than 3% of its weight of a water-soluble persulphate, which composition when mixed with water and heated, will produce a starch solution.

14. A composition of matter for use in making a starch solution, which comprises ordinary starch mixed with substantially less than 3% of its weight of a water-soluble persulphate, together with an alkaline reacting peroxidized compound in amount at least sufficient to neutralize acidity derived from said persulphate, which composition when mixed with water and heated will produce a starch solution.

15. A composition of matter for use in making a starch solution, which comprises ordinary starch mixed with about 0.1% to about 1% of its weight of a water-soluble persulphate, which composition when mixed with water and heated, will produce a starch solution.

JOSEF MÜLLER.